United States Patent [19]

Young

[11] Patent Number: 4,750,629
[45] Date of Patent: Jun. 14, 1988

[54] PLASTIC FLASK

[75] Inventor: William C. Young, Superior Township, Washtenaw County, Mich.

[73] Assignee: Plastipak Packaging, Inc., Plymouth, Mich.

[21] Appl. No.: 903,735

[22] Filed: Sep. 4, 1986

[51] Int. Cl.⁴ .......................... B65D 1/02; B65D 23/00
[52] U.S. Cl. .................................... 215/1 C; 215/1 R; 206/37
[58] Field of Search ................ 215/1 R, 1 C; 206/37; D9/378, 385, 403, 372, 383; 224/209

[56] References Cited

U.S. PATENT DOCUMENTS

| | | | |
|---|---|---|---|
| D. 80,117 | 12/1929 | De Vaulchier | D9/403 |
| D. 80,567 | 2/1930 | Fuerst | D9/372 |
| D. 92,491 | 6/1934 | Ratner | D9/372 |
| D. 108,113 | 1/1938 | Briner | D9/403 |
| D. 151,028 | 9/1948 | Blitzstien | D9/372 |
| D. 185,432 | 6/1959 | Goldstein | D9/372 |
| D. 198,943 | 8/1964 | Morgan | D9/380 |
| D. 201,470 | 6/1965 | Plattner | D9/403 |
| D. 213,543 | 3/1969 | Douglas | D9/403 |

OTHER PUBLICATIONS

"Trailwise", p. 39, The Ski Hut, 1615 University Avenue, Berkeley, Calif., 1964 catalog.

*Primary Examiner*—William Price
*Assistant Examiner*—Sue A. Weaver
*Attorney, Agent, or Firm*—Brooks & Kushman

[57] ABSTRACT

A plastic flask (10) is embodied by a blow molded plastic container (12) including an upper neck (14), a convex front wall (24), a concave rear wall (26), curved side walls (28), a pair of shoulders (30) extending laterally outward from the neck, and chamfers (32) that connect the shoulders with the concave back wall and the pair of side walls. These chamfers (32) reduce the internal volume of the plastic container (12) so as to be generally the same as a glass flask of the same outer size and shape when viewed from a frontal direction. Each chamfer (32) preferably has an inclined upper end (34) that is planar and of a triangular shape. Each chamfer (32) also preferably includes a planar portion provided by a lower end (36) that extends downwardly in a vertical direction from the inclined upper end (34). The container (12) can be made by an injection-stretch blow molding process so as to be biaxially oriented or by extruding a hot plastic parison that is formed to include a compacted neck. While any suitable plastic can be used in either mode of manufacturing, polyethylene terephthalate is one plastic that has particular utility for holding alcoholic beverages.

7 Claims, 2 Drawing Sheets

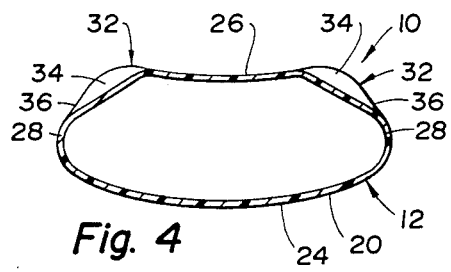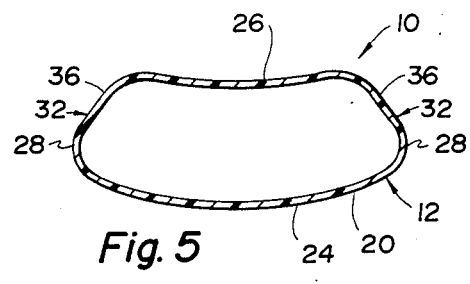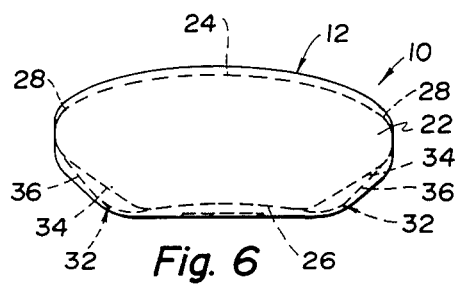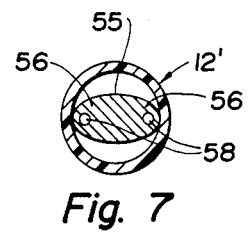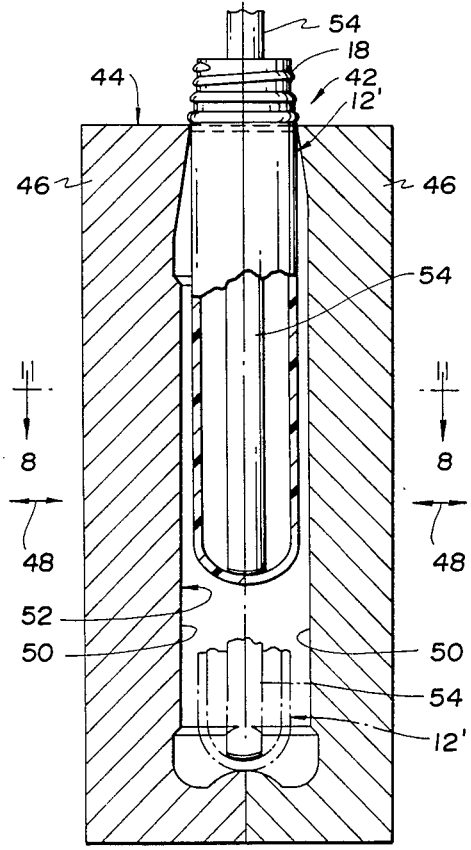

PLASTIC FLASK

TECHNICAL FIELD

This invention relates to a blow molded plastic flask for holding beverages.

BACKGROUND ART

Beverage flasks are normally made from glass and have a curved shape that facilitates carrying adjacent the body within a clothing pocket or otherwise. Such flasks are conventionally made from glass which can break if dropped or struck sharply. Also, glass flasks are relatively heavy which results in a weight disadvantage in addition to the breakage problem.

Plastic flasks have previously been developed to eliminate the breakage and weight problems involved with glass flasks. However, the walls of plastic flasks are substantially thinner than glass flasks which results in a packaging problem in relationship to the size of plastic flasks. A plastic flask that holds a given volume of liquid beverage necessarily has a much smaller outer size than a glass flask as a result of the thinner wall thickness of the plastic flask. This is a disadvantage from a marketing standpoint in that the consumer upon viewing glass and plastic flasks side-by-side will erroneously assume that tha plastic flask contains less liquid beverage. Furthermore, filling operations, packaging, shipping and store shelving considerations also make it desirable for a plastic flask to have the same height and lateral width as a glass flask for holding the same amount of liquid contents.

Injection stretch blow molding has previously been utilized to provide plastic containers whose mechanical properties are improved as a result of biaxial orientation that results from the stretch blow molding process. Such injection stretch blow molding has previously been done with round containers made of polyethylene terephthalate as disclosed by the U.S. Pat. No. 3,733,309 of Wyeth et al.

DISCLOSURE OF INVENTION

An object of the present invention is to provide an improved plastic flask that is blow molded from plastic and has the same outer size appearance as a glass flask for holdng an equivalent amount of liquid.

In carrying out the above object, a flask constructed in accordance with the invention includes a blow molded plastic container having an upper neck including an opening that can be selectively closed by a closure cap. A body portion of the container extends downwardly from the upper neck and has a lower closed end. The body portion of the container includes a convex front wall having a convex outer surface and also includes a concave back wall having a concave outer surface. The body portion also includes a pair of curved side walls. A pair of shoulders of the container are respectively located on opposite sides of the neck extending outwardly therefrom in opposite directions toward the curved side walls. A pair of chamfers respectively connect the pair of shoulders with the concave back wall and with the pair of side walls in a manner that reduces the interior volume of the container without being observable from the front which is displayed for viewing by the consumer when positioned on the store shelf.

The chamfers include upper ends that are inclined downwardly in a rearward direction with respect to the front and back walls of the container body portion. These inclined upper ends of the chamfers preferably each have a triangular shape. The chamfers also have lower ends including planar portions that extend vertically in a downward direction from the inclined upper ends.

In one preferred mode, the blow molded container is made from a plastic that is biaxially oriented by an injection stretch blow molding process that permits forming of the container with relatively uniform wall thickness by an initial cooling of the portions thereof which ultimately form the curved side walls of the container. An injection molded preform positioned within a mold used to form the container is axially stretched to provide the biaxial orientation upon the subsequent outward blowing operation and, as previously mentioned, is initially cooled at the portions which provide the curved side walls to prevent thinning thereof which would necessarily take place in view of the laterally elongated shape of the container body portion between its curved side walls.

In another preferred mode, the blow molded container is made from an extruded tubular parison with its neck compacted.

With both modes of forming the container, any suitable type of plastic can be used. However, polyethylene terephthalate is one plastic which has particular utility when used in either mode to make containers for holding alcoholic beverages, especially distilled spirits.

The objects, features, and advantages of the present invention are readily apparent from the following detailed description of the best modes for carrying out the invention when taken in connection with the acompanying drawings.

BRIEF DESCRIPTION OF THE DRAWINGS

FIG. 4 is a plan view taken in section through the flask along the direction of line 4—4 in FIG. 1;

FIG. 5 is a plan view taken in section through the flask along the direction of line 5—5 in FIG. 1;

FIG. 6 is a bottom plan view of the flask taken along the direction of line 6—6 in FIG. 1;

FIG. 7 is a plan view taken in section through a plastic preform and a cooling rod that initially cools the portions of the preform that ultimately form curved side walls of the plastic flask;

FIG. 8 is a partially sectioned view taken through blow molding apparatus that performs a biaxially oriented blow molding process according to one mode of forming the container;

FIG. 9 is a sectional view taken along line 8—8 of FIG. 7 through the blow molding apparatus that forms the biaxially oriented container; and FIG. 10 is a schematic view of blow molding apparatus that forms the container from an extruded hot plastic parison and provides the container with a compacted neck.

BEST MODE FOR CARRYING OUT THE INVENTION

Figure 1:
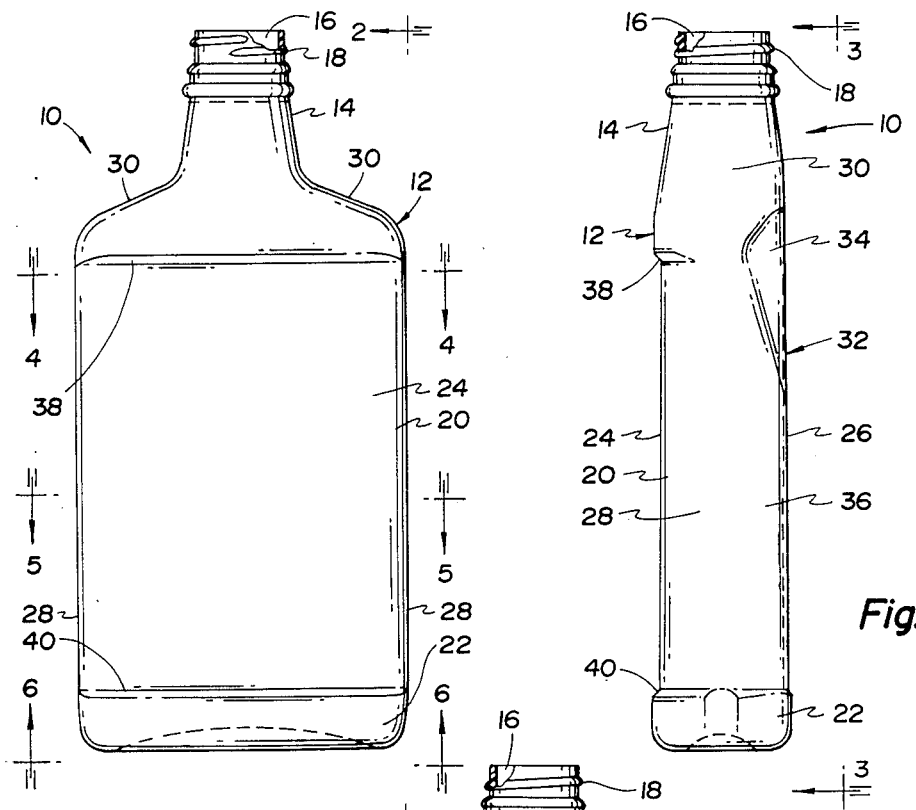
FIG. 1 is a front elevational view of a plastic flask constructed in accordance with the present invention.
Figure 2:
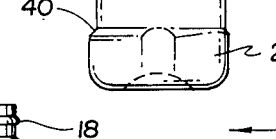
FIG. 2 is a side elevational view of the flask taken along the direction of line 2—2 in FIG. 1.
Figure 3:
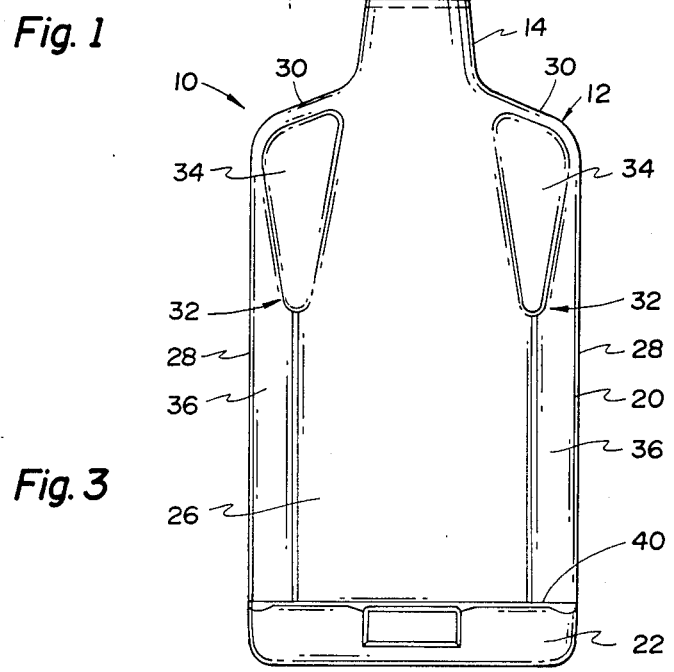
FIG. 3 is a back elevational view of the flask taken along the direction of line 3—3 in FIG. 3.

With reference to FIGS. 1-3 of the drawings, a plastic flask constructed in accordance with the invention is indicated by 10 and is embodied by a blow molded plastic container 12 which is formed in a manner that is hereinafter more fully described. The plastic container 12 has an upper neck 14 including an opening 16 that can be selectively closed by an unshown closure cap which is secured by a helical thread 18 extending around the opening. Container 12 has a body portion 20 that extends downwardly from the upper neck 14 and has a lower closed end 22. Body portion 20 of the container has a laterally elongated cross section with a relatively thin depth as illustrated in FIGS. 4 and 5 and includes a convex front wall 24 having a convex outer surface and a concave back wall 26 having a concave outer surface as well as a pair of curved side walls 28. A pair of shoulders 30 of the container 12 are respectively located on the opposite sides of the neck 14 extending outwardly therefrom in opposite directions toward the curved side walls 28.

As illustrated in FIGS. 2, 3, and 4, the container 12 includes a pair of chamfers 32 that respectively connect the pair of shoulders 30 with the concave back wall 26 and with the pair of curved side walls 28. These chamfers 32 reduce the interior volume of the flask without being observable from the front such that the flask is capable of having the same height, width, and outer size appearance as a glass flask of the same interior volume despite the thinner walls of the plastic flask.

As illustrated in FIGS. 2-4, the chamfers 32 include upper ends 34 that are inclined extending downwardly in a rearward and lateral outward direction with respect to the front and back walls of the flask. These inclined upper ends 34 of the chamfers preferably each have a triangular shape with slightly rounded corners as best illustrated in FIG. 3.

As illustrated in FIGS. 3 and 5, the chamfers 32 include planar portions 36 that extend vertically and constitute lower ends of the chamfers. The inclined upper ends 34 of chamfers 32 like the lower ends 36 thereof are planar and preferably have the triangular shape previously mentioned.

As illustrated in FIGS. 1 and 2, just below the shoulders 30, the convex front wall 24 of container 12 has an inwardly extending upper ridge 38. Adjacent the lower closed end 22 of the container body portion 20, a lower ridge 40 extends around the complete circumference of the container. Below this lower ridge 40 at the back side of the container as illustrated in FIG. 6, the lower closed end 22 has a straight shape as opposed to the concave shape of the back wall 26 in order to provide a more stable support of the flask when set on a flat surface. Also, the provision of the upper and lower ridges 38 and 40 together with the chamfers 32 provides a larger exterior appearance when viewed from the front as shown in FIG. 1 than would otherwise be the case.

With reference to FIGS. 8 and 9, the plastic flask 10 described is manufactured according to one preferred mode by blow molding apparatus 42 which includes a mold 44 having mold sections 46 that are movable between the closed position illustrated and an open position along the direction of arrows 48. Mold sections 46 include cavity sections 50 that cooperatively define an enclosed cavity 52 in the closed position corresponding to the outer shape of the container. During a blow molding cycle, the mold sections 46 of the mold 44 are closed with an injection molded plastic preform 12' of the container located within the cavity 52 as illustrated. This preform 12' has a length that is less than the height of the mold cavity 52.

As illustrated in FIGS. 8 and 9, the blow molding apparatus 42 includes a stretch rod 54 that extends through the opening of the container preform 12' and is movable from the solid indicated position to the phantom line indicated position to stretch the preform so as to assume the entire height of the mold cavity 52. This stretching provides axial orientation of the plastic while the subsequent lateral stretching upon the blow molding provides lateral orientation such that there is biaxial orientation that enhances the mechanical properties of the blown container.

As illustrated in FIG. 7, prior to positioning of the preform 12' within the mold, a cooling rod 55 of an oval shape with somewhat pointed ends 56 is positioned within the preform. These pointed ends 56 of the cooling rod 55 just touch the container preform 12' at the areas thereof which define the curved side walls 28 in the finally blown shape illustrated in FIGS. 4 and 5. This engagement provides cooling of the lateral extremities of the container preform 12' so as to prevent excessive thinning of the walls at the lateral extremities. The cooling of the lateral wall extremities makes these portions more viscous than the front and back portions such that the greater amount of stretching thereof to the final position during the blowing is compensated for by the greater viscosity to effect a generally uniformed wall thickness. Cooling passages 58 in the cooling rod 55 permit a liquid coolant to remove heat accumulated during each blow molding cycle so that a uniform temperature can be maintained from one cycle to the next.

With reference to FIG. 10, the plastic flask 10 described is manufactured according to another preferred mode by blow molding apparatus 42' which also includes the mold 44 whose mold sections 46 are shown in the closed position and are the same as those previously described. However, apparatus 42' includes an extruder 60 for extruding a hot plastic parison between the open mold sections 46. Upon mold closing, the extruded parison is clamped within the enclosed mold cavity. A compactor 62 provides a compacted neck of the container whose final shape is defined by blowing of the extruded parison to the shape of the mold cavity in a conventional manner.

With both modes of forming the container, any suitable type of plastic can be used. However, polyethylene terephthalate is one plastic that has particular utility when used in either mode to make containers for holding alcoholic beverages, especially distilled spirits.

While the best mode for carrying out the invention has been described in detail, those familiar with the art to which this invention relates will recognize various alternative designs and embodiments for practicing the invention as defined by the following claims.

What is claimed is:

1. A flask comprising: a blow molded plastic container having an upper neck including an opening that can be selectively closed by a closure cap; said container having a body portion that extends downwardly from the upper neck and has a lower closed end; said body portion of the container including a front wall having an exterior convex surface and also including a back wall having an exterior concave surface; the container body portion also including a pair of curved side walls; said container including a pair of shoulders respectively located on opposite sides of the neck extending outwardly therefrom in opposite directions toward the curved side walls; and a pair of chamfers that respectively connect the pair of shoulders with the back wall and with the pair of side walls, each chamfer having an upper end including a planr portion that is inclined and also having a lower end including a planar portion that extends vertically in a downward direction from the upper end, said planar portions of the chamfers reducing the interior volume of the container, and the chamfers being located adjacent the back wall so as not to be observable when viewing the front wall, whereby the flask is capable of having the same height, width, and outer size appearance from the front as a glass flask of the same interior volume while still having thinner walls.

2. A flask as in claim 1 wherein the inclined upper ends of the chamfers each have the planar portion thereof provided with a triangular shape.

3. A flask as in claim 1 wherein the plastic container is made from plastic that is biaxially oriented.

4. A flask as in claim 1 wherein the neck of the container is compacted.

5. A flask as in any preceding claim wherein the blow molded container is made from polyethylene terephthalate.

6. A flask comprising: a biaxially oriented blow molded plastic container that is made from polyethylene terephthalate and has an upper neck including an opening that can be selectively closed by a closure cap; said container having a body portion that extends downwardly from the upper neck and has a lower closed end; said body portion of the container including a front wall having an exterior convex surface and also including a back wall having an exterior concave surface; the container body portion also including a pair of curved side walls; said container including a pair of shoulders respectively located on opposite sides of the neck extending outwardly therefrom in opposite directions toward the curved side walls; a pair of chamfers that respectively connect the pair of shoulders with the back wall and with the pair of side walls; and each chamfer including an inclined upper end having a planar portion of a triangular shape and also including a planar lower portion that extends downwardly from the upper end, said planar portions of the chamfers reducing the interior volume of the container, and the chamfers being located adjacent the back wall so as not to be observable when viewing the front wall, whereby the flask is capable of having the same height, width, and outer size appearance from the front as a glass flask of the same interior volume while still having thinner walls.

7. A flask comprising: a blow molded plastic container having a compacted upper neck including an opening that can be selectively closed by a closure cap; said container having a body portion that extends downwardly from the upper neck and has a lower closed end; said body portion of the container including a front wall having an exterior convex surface and also including a back wall having an exterior concave surface; the container body portion also including a pair of curved side walls; said container including a pair of shoulders respectively located on opposite sides of the neck extending outwardly therefrom in opposite directions toward the curved side walls; a pair of chamfers that respectively connect the pair of shoulders with the back wall and with the pair of side walls; and each chamfer including an inclined upper end having a planar portion of a triangular shape and also including a planar lower portion that extends downwardly from the upper end, said planar portions of the chamfers reducing the interior volume of the container, and the chamfers being located adjacent the back wall so as not to be observable when viewing the front wall, whereby the flask is capable of having the same height, width, and outer size appearance from the front as a glass flask of the same interior volume while still having thinner walls.

* * * * *

UNITED STATES PATENT AND TRADEMARK OFFICE
CERTIFICATE OF CORRECTION

PATENT NO. : 4,750,629

DATED : June 14, 1988

INVENTOR(S) : William C. Young

It is certified that error appears in the above-identified patent and that said Letters Patent is hereby corrected as shown below:

Column 1, line 27, change "tha" to --the--;

Column 2, line 45, after "Fig." change "3" to --2--;

Column 5, line 7, claim 1, change "planr" to --planar--.

Signed and Sealed this

Twenty-first Day of March, 1989

Attest:

DONALD J. QUIGG

*Attesting Officer*  *Commissioner of Patents and Trademarks*